United States Patent [19]

Lindsay et al.

[11] Patent Number: 6,108,658
[45] Date of Patent: Aug. 22, 2000

[54] SINGLE PASS SPACE EFFICENT SYSTEM AND METHOD FOR GENERATING APPROXIMATE QUANTILES SATISFYING AN APRIORI USER-DEFINED APPROXIMATION ERROR

[75] Inventors: Bruce Gilbert Lindsay, San Jose; Gurmeet Singh Manku, Santa Clara; Sirdhar Rajogopalan, San Jose, all of Calif.

[73] Assignee: International Business Machines Corporation, Armonk, N.Y.

[21] Appl. No.: 09/050,434

[22] Filed: Mar. 30, 1998

[51] Int. Cl.[7] .................................................. G06F 17/30
[52] U.S. Cl. .............................. 707/101; 707/6; 707/7; 707/2
[58] Field of Search ................................ 707/2, 6, 7, 101

[56] References Cited

U.S. PATENT DOCUMENTS

| | | | |
|---|---|---|---|
| 4,379,948 | 4/1983 | Ney et al. ............................. | 179/1 SC |
| 4,530,076 | 7/1985 | Dwyer ................................... | 367/135 |
| 4,817,158 | 3/1989 | Picheny ................................. | 381/47 |
| 4,829,427 | 5/1989 | Green .................................... | 364/300 |
| 5,018,088 | 5/1991 | Higbie .................................. | 364/574 |
| 5,091,967 | 2/1992 | Ohsawa ................................ | 382/22 |
| 5,105,469 | 4/1992 | MacDonald et al. ................ | 382/17 |
| 5,345,585 | 9/1994 | Iyer et al. ............................. | 395/600 |
| 5,379,419 | 1/1995 | Heffernan et al. .................. | 395/600 |
| 5,664,171 | 9/1997 | Agrawal et al. ..................... | 395/602 |
| 5,864,841 | 1/1999 | Agrawal et al. ..................... | 707/2 |

OTHER PUBLICATIONS

Sridhar Rajagopalan et al, "Approximate Order Statistics in One Pass and Little Memory: Theory and Database Applications", IBM Almaden Research Center, Nov. 3, 1997, pp. 1–18.

Viswanath Poosala et al, "Improved Histograms for Selectivity Estimation of Range Predicates", SIGMOD, Jun. 1996, pp. 294–305.

Raj Jain & Imrich Chlamtac, "The P[2] Algorithm for Dynamic Calculation of Quantiles and Histograms Without Storing Observations", Communications of the ACM, vol. 28, No. 10, Oct. 1995, pp. 1076–1085.

Khaled Alsabti et al, "A One–Pass Algorithm for Accurately Estimating Quantiles for Disk–Resident Data", Proceedings of the 23rd VLDB Conference, Athens, Greece, 1997, pp. 346–355.

Richard J. Lipton et al, "Efficient sampling strategies for relational database operations", Elsevier Science Publishers A.V., 1993, pp. 195–226.

Rakesh Agrawal & Arun Swami, "A One–Pass Space–Efficient Algorithm for Finding Quantiles", 7th Int'l Conf. Management of Data (COMAD –95), Prune, India 1995, pp. 1–12.

L.G. Valiant, "A Theory of the Learnable", Communications of the ACM, vol. 27, No. 11, Nov. 1984, pp. 1134–1142.

Ira Pohl, "A Minimum Storage Algorithm for Computing The Median", IBM Thomas J. Watson Research Center, Nov. 17, 1969, pp. 1–6.

(List continued on next page.)

*Primary Examiner*—Wayne Amsbury
*Assistant Examiner*—Thuy Pardo
*Attorney, Agent, or Firm*—Gray Cary Ware Freidenrich

[57] ABSTRACT

A system and method for finding an $\epsilon$-approximate $\phi$-quantile data element of a data set with N data elements in a single pass over the data set. The $\epsilon$-approximate $\phi$-quantile data element is guaranteed to lie within a user-specified approximation error $\epsilon$ of a true $\phi$-quantile data element being sought. B buffers, each having a capacity of k elements, initially are filled with sorted data elements from the data set, with the values of b and k depending on $\epsilon$ and N. The buffers are then collapsed into an output buffer, with the remaining buffers then being refilled with data elements, collapsed (along with the previous output buffer), and so on until the entire data set has been processed and a single output buffer remains. A data element of the output buffer corresponding to the $\epsilon$-approximate $\phi$-quantile is then output as the approximate $\phi$-quantile data element. If desired, the system and method can be practiced with sampling to even further reduce the amount of space required to find a desired $\epsilon$-approximate $\phi$-quantile data element.

35 Claims, 6 Drawing Sheets

OTHER PUBLICATIONS

Dorit Dor & Uri Zwick, "Selecting the Median", Proceedings of the Sixth Annual ACM–SIAM Symposium On Discrete Algorithms, San Francisco, California 1995, Chapter 4, pp. 28–37.

David J. DeWitt et al, "Parallel Soring on a Shared–Nothing Architecture using Probabilistic Splitting", ACM SIGMOD & SIGARCH, IEEE Computer Society, Dec. 1991, pp. 280–291.

P. Griffiths Selinger et al, "Access Path Selection In a Relational Database Management System", ACM–SIGMOD 1979, pp. 23–34.

Mike Paterson, "Progress in Selection", Dept. of Computer Science.

William Feller, "An Introduction to Probability Theory and Its Applications", Chapter IX, vol. 1, 3rd Ed., pp. 212–242.

R. Agrawal, et al., "Mining Association Rules Between Sets of Items in Large Databases", *Proceedings of the ACM SIGMOD Conference on Management of Data*, pp. 207–216, Washington, D.C., May 1993.

Aditya P. Gurajada et al, "Equidepth Partitioning of a Data Set based on Finding its Medians", IEEE, Feb. 4, 1991, pp. 92–101.

Bruce W. Schmeiser & Stuart Jay Deutsch, "Quantile Estimation From Grouped Data: The Cell Midpoint", Commun. Statist. Simula. Computa, B6(3), 1997, pp. 221–234.

Bruce W. Schmeiser, "The Generation of Order Statistics In Digistal Computer Simulation: A Survey", pp. 137–140.

M. Muralikrishna & David J. DeWitt, "Equi–Depth Histograms For Estimating Selectivity Factors For Multi–Dimensional Queries", ACM, 1988, pp. 28–36.

Gregory Piatetsky–Shapiro et al, "Accurate Estimation of the Number of Tuples Satisfying A Condition", ACM, 1984, pp. 256–276.

J.J. Munro et al, "Selection and Sorting With Limited Storage", Theoretical Computer Science 12, 1980, pp. 315–323.

OUTPUT: | 23 52 83 114 143 |   weight 9.

Sorted Sequence          (offset = 5)

```
 12  12  23  23  | 23|  33  33  33  44
 44  44  44  52  | 52|  64  64  64  64
 72  72  83  83  | 83|  94  94  94  94
102 102 114 114  |114|  114 124 124 124
124 132 132 143  |143|  143 153 153 153
```

INPUT:
| 12 52 72 102 132 |   weight 2,
| 23 33 83 143 153 |   weight 3,
| 44 64 94 114 124 |   weight 4.

FIG. 5B

SINGLE PASS SPACE EFFICENT SYSTEM AND METHOD FOR GENERATING APPROXIMATE QUANTILES SATISFYING AN APRIORI USER-DEFINED APPROXIMATION ERROR

BACKGROUND OF THE INVENTION

1. Field of the Invention

The present invention relates generally to computer systems, and more particularly to systems and methods for determining one or more quantiles for large sets of data while minimizing the amount of memory needed for computation.

2. Description of the Related Art

Order statistics are used to characterize large sets of data either on line, or in storage. One significant statistic that provides information relevant to the characterization of large sets of data is the quantile. A quantile is the element at a specific position in a sorted sequence of data. Quantiles are of interest, for example, to both database designers and database implementers. In this regard, quantiles are of interest because they more realistically characterize distributions of real world data sets and are less sensitive to outlying data points than, e.g., the mean value of a data set, or the variance of a data set.

As but one example of when a quantile might be useful, a user might want to identify salespersons who are performing well (or poorly) using a personnel database that lists the total sales for each sales person. Because there are a few sales persons with exceptionally high sales (and no sales below zero), and because the distribution of total sales is not Gaussian or distributed in accordance with any other well-known statistical measure, using the average and standard deviation of total sales is not a good method for evaluating salesperson performance. Instead, the user needs to determine the value of the 0.95-quantile (0.05-quantile) of total sales and classify sales persons relative to that value. Similarly, housing prices in a region are typically reported in terms of the median sales price which is also the 0.50-quantile price because the sales of a few very high price homes tends to make the average home sales price not representative of the market as a whole.

Quantile determination has many other applications in the processing of scientific, business, and industrial information. Two such additional applications are database partitioning during parallel processing, and data mining. Thus, the skilled artisan will appreciate that determining quantiles is an important task for processing many if not most data sets.

Like many other computer tasks, the determination of quantiles must take into account several practical considerations. Specifically, quantiles should be generated while optimizing computational efficiency, minimizing the amount of computer main memory space consumed, and still producing an exact or at least quantifiably accurate approximate quantile.

First, for computational efficiency it is desirable that the determination of quantiles not require multiple passes over a data set to perform calculations. Indeed, limiting processing to only a single pass over a data set is highly desirable from a computational efficiency viewpoint. Processing data in only a single pass, however, is somewhat challenging in part because no assumptions can be made regarding the order of arrival of elements from a data set or their value distributions. Nevertheless, it is desirable that quantiles be generated in only a single pass without depending on assumptions about the arrival order of data for efficiency or correctness.

Additionally, as stated above the amount of memory required to find quantiles should be minimized. Thus, although one computationally efficient way to find quantiles of a data set would be to buffer the entire data set in memory and then process the set, this would require excessive memory and accordingly is not very desirable. Instead, it is desirable to conserve memory, while still promoting computational efficiency.

It is possible to conserve memory space and at the same time promote computational efficiency, by substituting approximate quantiles for exact quantiles, depending, of course, on the particular application. It would be desirable that the accuracy of an algorithm that finds approximate quantiles be tunable to the level of accuracy required for the application, with its performance degrading gracefully if at all when the accuracy requirements are increased.

Munro et al., in an article entitled "Selection and Sorting with Limited Storage" published in *Theoretical Computer Science*, 12:315–323 (1980) disclose finding an exact median while minimizing the number of passes over a data stream. However, because they seek to find an exact median, Munro et al. require more than one pass over the data set. As mentioned above, it is most desii able that only a single pass be required.

Agrawal et al., in an article entitled "A One-Pass Space-Efficient Algorithm for Finding Quantiles" published in *Proc. 7th Int'l Conf. Management of Data* (1995), disclose a method for finding approximate quantiles in a single pass over a data stream, but without any apriori guarantee on the approximation error. Without any apriori guarantee on the approximation error, practitioners are reluctant to use algorithms that produce approximate quantiles.

SUMMARY OF THE INVENTION

Using this invention, it is possible to provide a system and method for generating approximate quantiles that requires only a single pass over a data set, conserves memory space, and guarantees that the approximate quantiles will lie within a user-defined error limit. The present invention still further recognizes that it is possible to provide a system and method for generating approximate quantiles that can be coupled to sampling for further reducing memory requirements, while satisfying a user-defined probability of successfully producing an approximate quantile within a user-defined error limit.

Accordingly, it is an object of the present invention to provide a system and method for finding quantiles in a data set that requires only a single pass over the data set, without requiring a particular order in the data being input from the data set. Another object of the present invention is to provide a system and method for finding quantiles in a data set that is space efficient. Still another object of the present invention is to provide a system and method for finding approximate quantiles in a data set that are guaranteed to lie within a user-defined approximation error limit or bound. Yet another object of the present invention is to provide a system and method for finding approximate quantiles of a data set using a sample of the data set, with the quantiles guaranteed to lie within a user-defined approximation error limit with a user-defined probability. Another object of the present invention is to provide a system and method for finding approximate quantiles in a data set that are easy to use.

Rigorously, given $N$, $\phi$, and $\epsilon$, the invention, in a single pass, computes, with minimal use of memory, an $\epsilon$-approximate $\phi$-quantile of a data set of size $N$. The $\phi$-quantile, for $\phi \in [0,1]$, is defined to be the data element in position $\lceil \phi N \rceil$ in the sorted sequence of the data set. Here, and in the rest of this description, N denotes the number of elements in the data set. For $\phi=0.5$, the quantile is called the median. A data element is said to be an $\epsilon$-approximate $\phi$-quantile if its rank is between $\lceil(\phi-\epsilon) N\rceil$ and $\lceil(\phi+\epsilon) N\rceil$. Clearly, there could be several data elements in the data set that satisfy this condition.

The invention may be embodied as a general purpose computer programmed to determine an approximate $\phi$-quantile data element in a data set having N data elements, within a user-defined value of an approximation error parameter, $\epsilon$. The invention may also be embodied as an article of manufacture—a machine component—that is used by a digital processing apparatus and which tangibly embodies a program of instructions that are executable by the digital processing apparatus to determine a desired $\epsilon$-approximate $\phi$-quantile data element in a data set. This embodiment is realized in a critical machine component that causes a digital processing apparatus to perform the method steps of this invention.

In accordance with this invention, the machine component includes computer usable code means that in turn include means for determining a number b of buffers and a size k of each buffer, based at least in part on the values of $\epsilon$ and N. Also, the computer usable code means include means for filling empty buffers with data elements input from the data set to establish at least some input buffers. Moreover, means are provided for collapsing data set elements in at least some input buffers into at least one output buffer. And, computer code means determine and identify data elements of the data set that are near one or more $\phi$-quantile positions in a final output.

In a preferred embodiment, at least one output buffer is used as an input buffer for a subsequent collapse operation. In this preferred embodiment, the means for collapsing is invoked only when all buffers contain k data elements, or there are no more data elements to be input from the data set.

Preferably, the means for collapsing includes means for sorting data elements in at least some input buffers, with each input buffer $X_i$ having a respective weight $W(X_i)$ that is representative of a number of data elements represented by each data element of the input buffer. Means are also provided for selecting the next sorted data element from the input buffers for merging. Additionally, a counter is incremented $w_i$ times in response to the means for selecting the next sorted data element. The means for collapsing further includes means for designating the next data element from an ith input buffer as an output buffer data element when the counter has counted to at least a predetermined value.

In a particularly preferred embodiment, the means for collapsing further includes means for collecting data elements designated as output buffer data elements into an output buffer. Moreover, the means for collapsing includes means for designating the input buffers as empty, and means for designating the output buffer as a full input buffer. Means are provided for then reinvoking the means for filling to fill with data elements input buffers designated as empty, with each full input buffer being usable as an input buffer by the collapsing means.

From one perspective, the means for collapsing can be represented by a data tree having a number of levels l, in which l is an integer having a value greater than or equal to 0, with 0 being the lowest level of the data tree. With this in mind, means can be provided for establishing a lowest level of full buffers in the data tree. The means for filling is invoked when one or more empty buffers exist, and the means for invoking promotes an empty buffer to a level l above 0 when exactly one empty buffer exists. Otherwise, when more than one empty buffer exists, each empty buffer is assigned to the lowest level of the data tree, the lowest level being 0. The means for collapsing is invoked to collapse buffers at level l into an output buffer when no empty buffers exist, and the resulting output buffer is raised to level l+1.

Per this invention, the means for determining b and k determines values for these parameters to minimize the product b*k, subject to at least one constraint. This constraint is a function of the value of $\epsilon$ and the number N of data elements in the data set. Preferably, two constraints are examined in determining values for the integers b and k.

In one preferred embodiment, an input data set is a sampled data set containing s data elements of a larger data set containing N data elements, where N>s. As intended by the present invention, s is sufficiently large such that the $\epsilon/2$-approximate $\phi$-quantile data element of the sampled data set is guaranteed to represent an $\epsilon$-approximate $\phi$-quantile data element of the large, N-member data set, with a probability of 1-$\delta$. As set forth below, $\delta$ has a user-defined value between zero and one.

In another aspect of the present invention, for a set of N data elements having a user-sought $\phi$-quantile, a computer-implemented method is disclosed for generating, in a single pass over the data set, an $\epsilon$-approximate $\phi$-quantile representative of the true $\phi$-quantile while minimizing computer memory requirements. The method includes establishing b buffers having capacities to hold k data elements, wherein b and k are integers fixed to enforce the $\epsilon$-approximate guarantee. Also, the method includes alternately filling empty buffers with data elements from the data set to establish input buffers and then storing only a subset of the data elements in the input buffers into one or more output buffers until the entire data set is processed. A data element stored in one of the final output buffers is the approximate quantile.

In yet another aspect, a computer program device includes a computer program storage device that is readable by a digital processing apparatus. A program means is stored on the program storage device, and the program means includes instructions executable by the digital processing apparatus for performing method steps for determining an $\epsilon$-approximate $\phi$-quantile data element in a data set of N data elements. These method steps include filling at most b empty buffers with at most k data elements to establish at least some input buffers. The integers b and k are fixed to enforce the approximation guarantee. Also, the method includes storing a subset of the data elements in the input buffers in at least one output buffer. A data element is identified in a final output as the $\epsilon$-approximate $\phi$-quantile.

Another aspect of this invention is embodied in a method for determining an $\epsilon$-approximate $\phi$-quantile of a number N of data elements in a single pass over a data set containing the data elements while minimizing memory usage and meeting an the approximation guarantee. The method includes receiving a value of $\phi$, an approximate quantile to be produced, receiving the number N of data elements, and receiving a value of $\epsilon$ the approximation parameter. Based at least in part on the desired approximation guarantee and the number of data elements, a number of buffers and a size of each buffer are determined. Then, the data elements from the data set are loaded into the buffers, sorted, and collapsed when all buffers are in a full state. The loading, sorting, and collapsing steps are repeated until the data set is in an empty state, and then an approximate $\phi$-quantile data element is output, based on a final output step.

BRIEF DESCRIPTION OF THE DRAWINGS

FIG. 5B illustrates an example of the COLLAPSE operation;

DETAILED DESCRIPTION OF THE PREFERRED EMBODIMENTS

Figure 1:
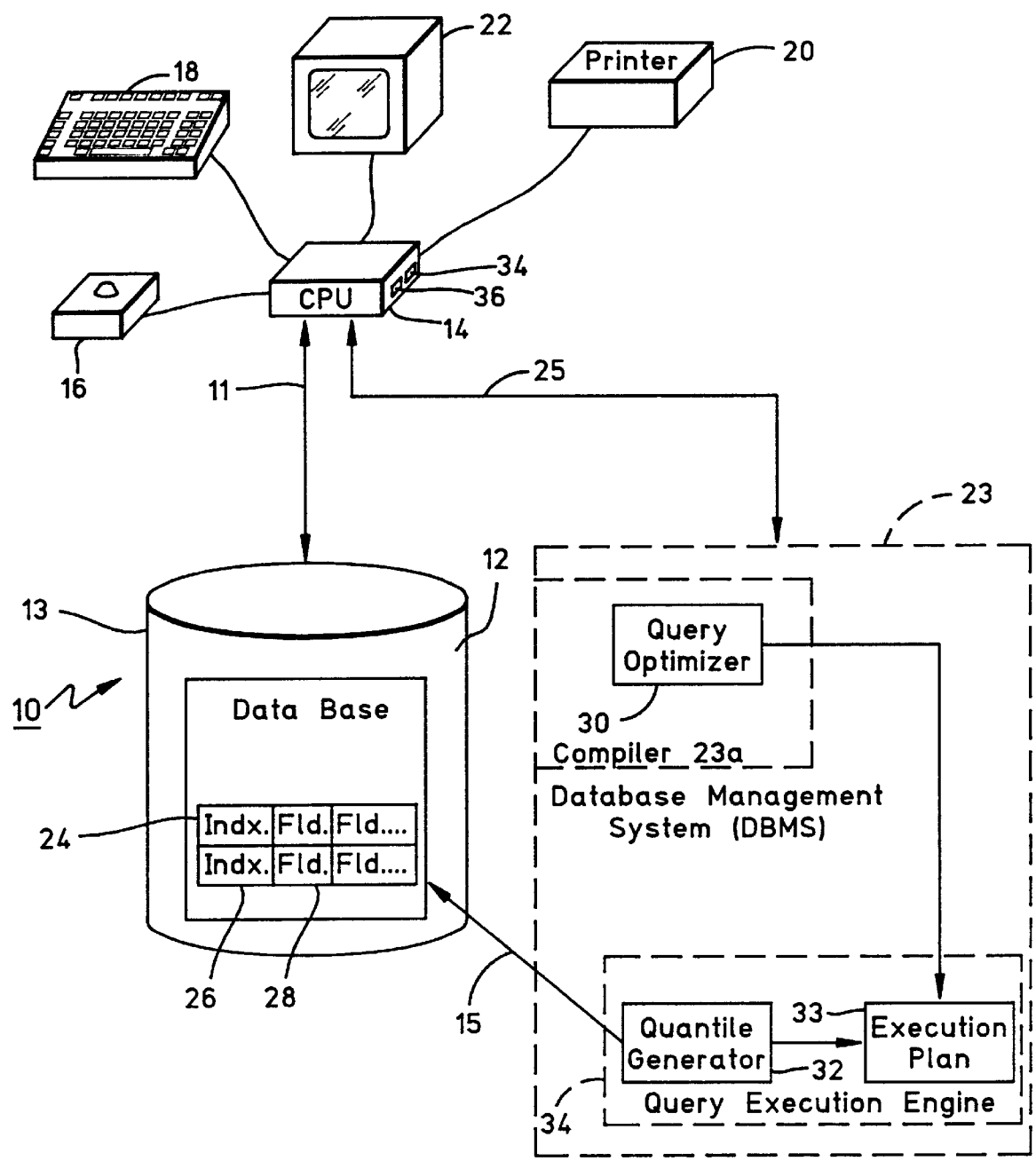
FIG. 1 is a schematic diagram showing a system in which the invention may be practiced.

FIG. 1 illustrates a system, generally designated 10, for accessing, via a 20 communication path 11, a data set as may be embodied, for example, in a very large data base 12. There are N data elements in the data set, which may be retrieved in a single pass over the data set. N is an integer. The N data elements of the data set may reside, for example, in one or more storage devices such as the device 13. According to this invention, the system identifies $\epsilon$-approximate $\phi$-quantile data elements of the data set. In the particular architecture shown, the system 10 includes a programmable, general purpose digital processing apparatus, such as a computer 14. In one intended embodiment, the computer 14 may be a personal computer made by International Business Machines Corporation (IBM) of Armonk, N.Y., or the computer 14 may be any computer, including computers sold under trademarks such as AS400, with accompanying IBM Network Stations. Or, the computer 14 may be a Unix computer, or OS/2 server, or Windows NT server, or IBM RS/6000 250 workstation or an IBM laptop computer.

As shown in FIG. 1, the computer 14 is electrically connected to one or more input devices, e.g., a mouse 16 and a keyboard 18, which can be manipulated by a user of the system 10 to input information and/or to generate queries for data. For example, a user input may explicitly or implicitly define values for one or more parameters, including one or more approximate $\phi$-quantiles, an approximation error $\epsilon$ and, under sampling circumstances as described below, a probability factor $\delta$. Data retrieved in response to a query can be output via the communication path 11 through an output device such as a printer 20 or monitor 22 that are conventionally coupled to the computer 14.

As but one example of how the present invention may be applied, a database :15 management system (DBMS) 23 of the compiling kind executes in the computer 14, receiving, among other things, user inputs and database queries. The DBMS 23 processes the inputs and queries, providing access to the database 12. The DBMS 23 includes a compiler 23a. Although the DMBS 23 is shown outside the computer 14, this is for purposes of illustration only, it being understood that the DBMS is executed in and by the computer 14, using the resources of the computer 14, including its main memory.

FIG. 1 shows that the storage device containing the database 12 electronically stores a plurality of data records 24, commonly referred to as tuples. Each data record 24 can include an index element 26 and a plurality of field elements 28, commonly referred to as attributes. For example, each data record 24 may contain personnel information, with the fields 28 containing values for attributes of the person such as age, height, gross sales, and so on. Communications between the processes executing in the computer 14 and the DBMS 23 are symbolized by the two-way communication path 25.

As disclosed previously, the present space-efficient system and method for finding quantiles within user-defined error bounds has many applications. In but one illustrative use of the present invention, the user might want to retrieve quantile information from the database 12 by executing a query, and to do so the user manipulates the mouse 16 or keyboard 18 as appropriate. Typically, a query is executed in the context of an application program containing one or more database queries. Prior to execution of the application program, it is compiled. In this phase, the queries in the application program are removed and replaced with calls to routines which are bound to the application program. These routines are optimized machine language procedures produced by compilation of the queries by the DBMS compiler 23a. The routines are contained in an execution plan produced by the compiler 23a.

During compilation, queries specified by a user or by an application program are forwarded to a query optimizer 30 that is included in the query compiler 23a for determining how to efficiently produce answers to the queries. As but one example, the query optimizer 30 can be one of the optimizers discussed by Jarke et al in "Query Optimization in Database Systems", 16 ACM Computing Surveys 2 (June 1984). In the course of determining an execution plan for producing an answer to a query, the query optimizer may make use of order statistics, including $\epsilon$-approximate $\phi$-quantiles, describing the distributions of data values in selected fields 28 of database tuples 24 to estimate the effects of predicates in the query on the sizes of intermediate and final query answer sets. In can be understood that the present invention can be used to provide order statistics, sometimes called histograms, for use by a query optimizer 30 in its estimations of intermediate and final query answer set sizes. In a preferred embodiment, the function of the invention in generating $\epsilon$-approximate $\phi$-quantiles would be performed prior to the compilation and optimization of the particular queries exploiting those quantiles.

In accordance with the method described below, the query optimizer 30 produces a query execution plan 33 that is followed at runtime for execution of the corresponding database query. Pursuant to optimizing a user specified query requiring quantile values from database data sets, the query optimizer 30 may generate a query plan specifying the use of a quantile engine 32 constructed according the methods/processes of the present invention to produce $\epsilon$-approximate $\phi$-quantile values from a set of field values 28 derived directly, or indirectly, for tuples 24 stored in database 12. Typically, the execution plan 33 and the quantile engine 32 are found in a query execution engine 34.

The quantile engine 32 receives and manipulates the data elements of the data set when they are in the main memory of the computer 14 to perform the functions and/or steps of the invention that are illustrated in FIGS. 2–8.

The flow charts and diagrams of FIGS. 2–8 illustrate the structure of a quantile generator of the present invention as embodied in computer program software that executes functions that may be included for example in the quantile engine 32. In other words, the quantile generator of this invention may be illustratively embodied as a component of a quantile engine. This is not, however, meant to limit the application of this invention to database management systems, or to a software implementation. Indeed, the quantile generator can be used in any machine or method that generates order statistics for scientific, business, and/or industrial data. Furthermore, the invention can be embodied in general or special purpose processors, application specific integrated circuits (ASIC), programmed logic, discrete logic, application software, compiler software, or microcode. Manifestly, the invention may also be practiced in a machine component that instructs a digital processing apparatus (that is, a computer) to perform a sequence of function steps corresponding to those shown.

Assume for the sake of illustration that the quantile engine 32 is a computer program that is executed by a processor within the computer 14 as a series of computer-executable instructions. In addition to the drives 34, 36, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled C++ compatible code.

THE INVENTION

The invention solves the problem of computing order statistics of large sets of online or disk-resident data using as little main memory as possible. The invention computes quantiles, which are data elements at specific positions in the sorted order of the data set. The φ-quantile, for $\phi \in [0,1]$, is defined to be the data element in position $\lceil \phi N \rceil$ in the sorted sequence of the data set. Here, and in the rest of this description, N denotes the number of elements in the data set. For φ=0.5, the quantile is called the median. A data element is said to be an ε-approximate φ-quantile if its rank is between $\lceil (\phi-\epsilon)N \rceil$ and $\lceil (\phi+\epsilon)N \rceil$. Clearly, there could be several data elements in the data set that satisfy this condition.

Figure 2:
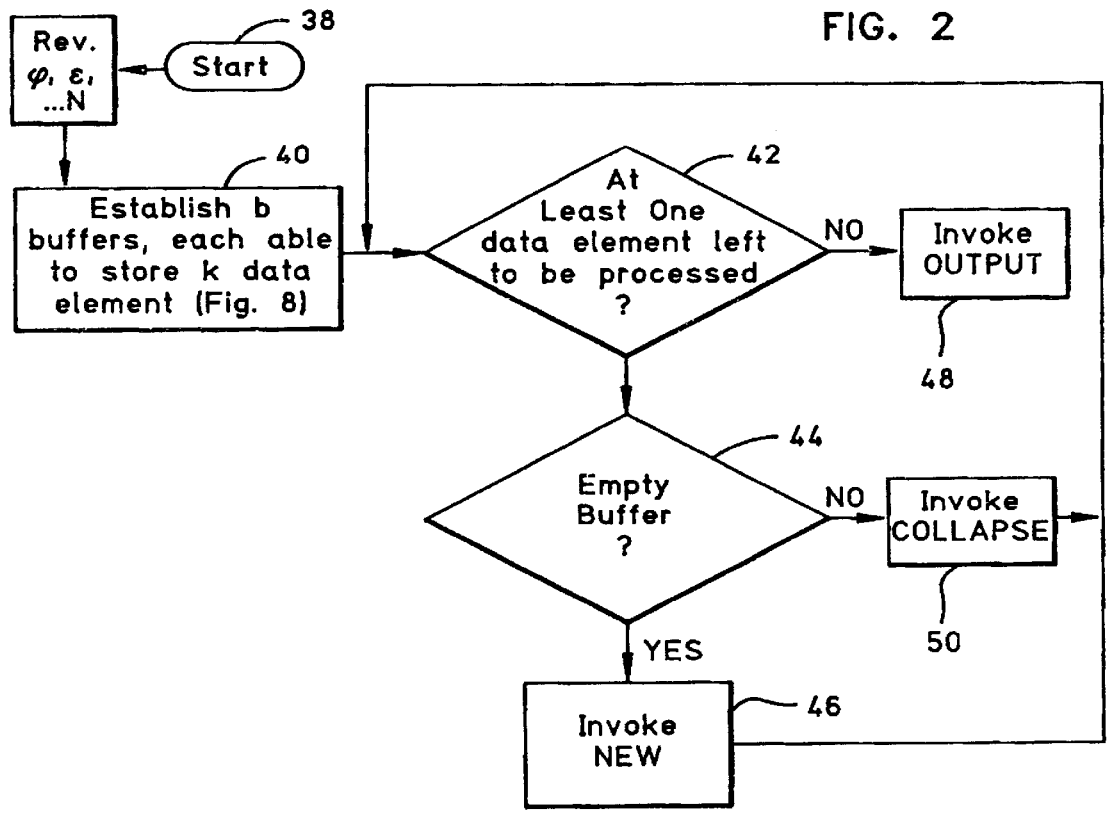
FIG. 2 is a flow chart showing the overall steps of the invention in generating approximate quantiles in a data stream.

Now referring to FIG. 2, the overall steps executed by logic for generating quantiles can be seen. Commencing at start state 38, the process moves to block 39 to receive a user-specified φ-quantile, a user-specified approximation error ε, and a number N of data elements in a data set to be processed. The logic then moves to block 40 to establish an integer number b of buffers, each having a capacity or size k of elements, wherein k is an integer. The integers b and k are established as discussed further below in reference to FIG. 8 based upon the user-specified approximation error ε. It is to be understood that "user-specified" means that a parameter value is input by a human user, or established by a computer program such as the quantile engine 30 shown in FIG. 1. In any case, the particular parameter value is established apriori. Data elements are input to the buffers from the data set.

The logic moves to decision diamond 42 to determine whether at least one data element in the data set remains unprocessed. When the data set contains more (i.e., unprocessed) data elements, the logic moves to block 44 to determine if any buffers are empty. If an empty buffer remains, the logic loops through block 46 to invoke a NEW operation described in reference to FIG. 3, wherein empty buffers are filled with data elements from the as-yet-unemptied data set. Otherwise, if, in decision diamond 42, there are no data elements left to process, the logic moves to block 48 to invoke an OUTPUT operation discussed below in reference to FIG. 6, wherein one or more data elements approximating the true φ-quantiles being sought are chosen from the non-empty input buffers to be designated as one or more quantiles being sought.

Figures 6, 7:
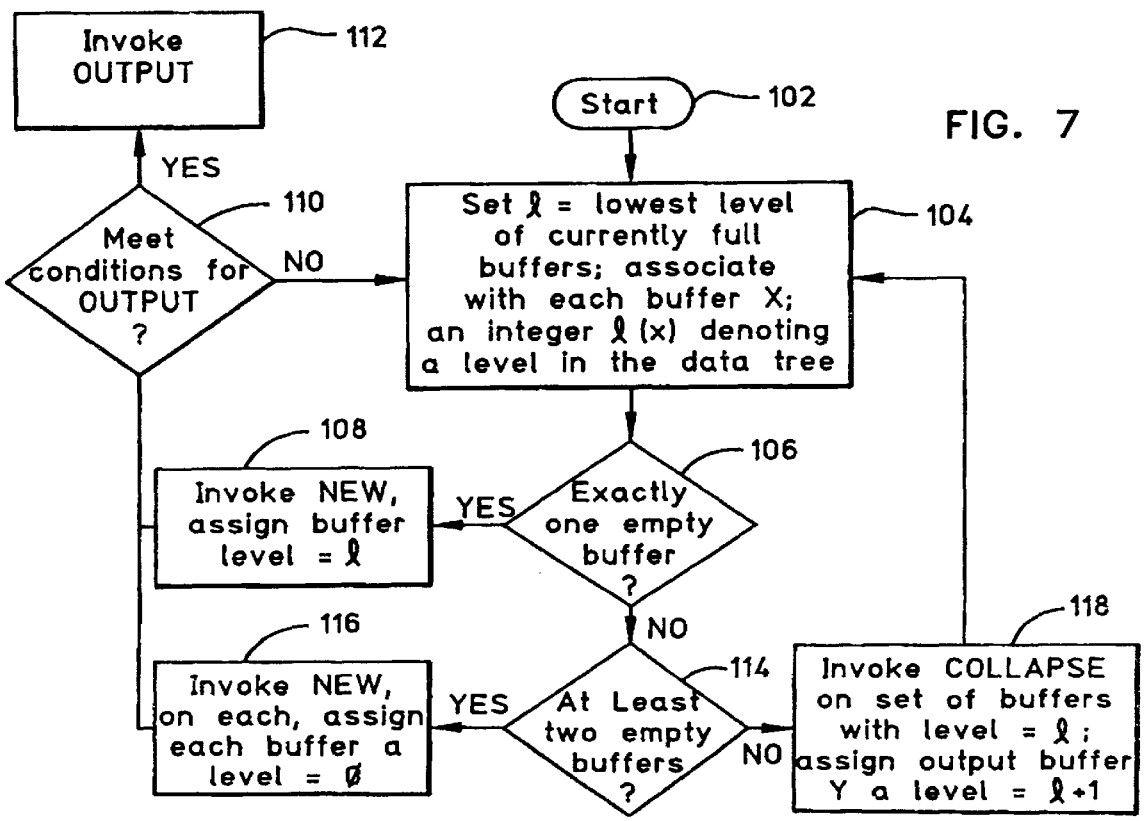
FIG. 6 is a flow chart showing an OUTPUT operation for outputting a final output buffer with approximate $\phi$-quantile data element.
FIG. 7 is a flow chart showing a specific policy for invoking the NEW and COLLAPSE operations.

When it is determined in decision diamond 44 that no empty buffers exist, the logic moves to block 50. As indicated, at block 50 a COLLAPSE operation shown and described below in reference to FIG. 6 is invoked to collapse input buffers into one or more output buffers. Thus, the COLLAPSE operation results in a subset of data elements in the input buffers being stored in an output buffer.

The NEW Operation

This operation fills an empty buffer with data elements from the data set. It is invoked only if there is an empty buffer and at least one unprocessed data element in the data set. The operation simply populates an empty input buffer with the next k elements from the data set, labels the buffer as full, and assigns it a weight of 1. If the buffer cannot be filled completely because there are less than k remaining data elements in the data set, an equal number of $-\infty$ and $+\infty$ data elements are added to make up the deficit.

Let the size of an augmented data set, consisting of the original data set and $-\infty$ and $+\infty$ elements added to the last buffer, be βN for some $\beta \geq 1$. Let $$\phi' = \frac{2\phi + \beta - 1}{2\beta}.$$

It is clear that the φ-quantile of the original data set of size N corresponds to the φ'-quantile of the augmented data set of size βN.

Figure 3:
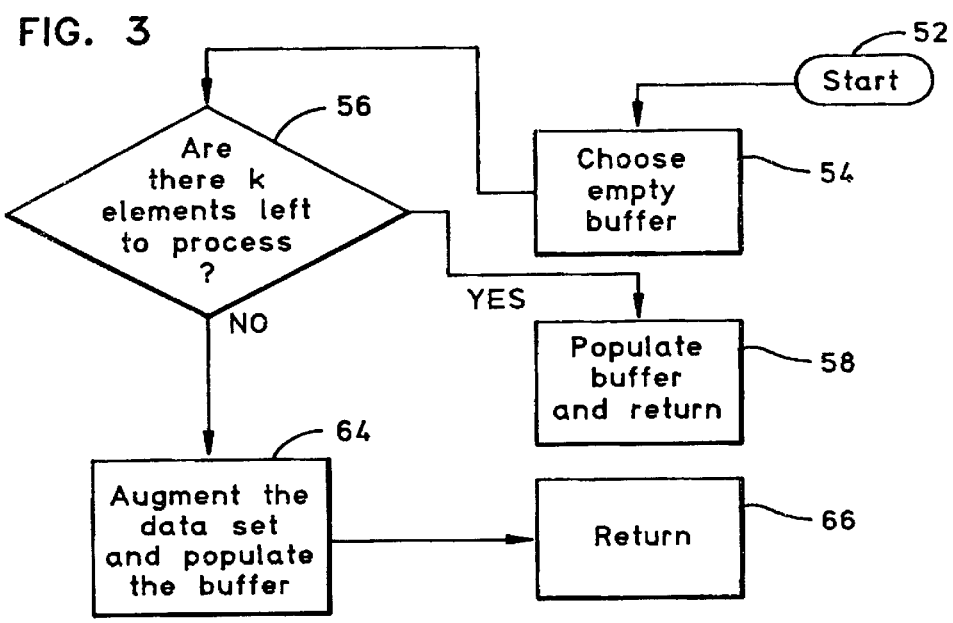
FIG. 3 is a flow chart showing a NEW operation for filling empty buffers.

FIG. 3 shows the NEW operation. Commencing at start state 52, the logic moves to block 54 to choose an empty buffer. Proceeding to decision diamond 56, the logic determines whether less than k data elements in the data set remain to be processed. If more than k data elements remain unprocessed, the logic moves to block 58 to populate the input buffer $X_i$ with the next k data elements of the data set. Also at block 58, the input buffer $X_i$ is assigned a weight $w(X_i)$ of 1. Thus, the weight of each input buffer is proportional to, but not necessarily equal to, the number of data elements in the data set represented by each data element in the input buffer.

Recall that at decision diamond 56 it is determined whether less than k data elements remain in the input data stream. If this test is positive, the logic moves to block 64 to add the m remaining data elements to the input buffer, m<k, and also to add equal numbers of $+\infty$ and $-\infty$ data elements to the buffer to make up the (k−m) deficit. The logic then moves to block 66.

The COLLAPSE Operation

This operation takes $c \geq 2$ full input buffers, $X_1, X_2, \ldots, X_c$, and outputs a buffer, Y, all of size k. In the end, all but one input buffer is marked empty. The output Y is stored in the buffer that is marked full. Thus, Y is logically different from $X_1, X_2, \ldots, X_c$ but physically occupies space corresponding to one of them.

The weight of the output buffer w(Y) is the sum of weights of input buffers, $$\sum_{i=1}^{c} w(X_i).$$

Consider making $w(X_i)$ copies of each data element in $X_i$ and sorting all the input buffers together, taking into account the multiple copies. The elements in Y are simply k equally spaced data elements in this (sorted) sequence. If $w(Y)$ is odd, these k data elements are in positions $$jw(Y) + \frac{w(Y) + 1}{2}$$

for j=0, 1, . . . k−1. The quantity $$jw(Y) + \frac{w(Y) + 1}{2}$$

is called the offset for this COLLAPSE. If $w(Y)$ is even, there are two choices: either choose data elements in positions $$jw(Y) + \frac{w(Y)}{2}$$

or those in positions $$jw(Y) + \frac{w(Y) + 2}{2}$$

for j=0, 1, . . . k−1. The COLLAPSE operator alternates between these two choices on successive invocations with even $w(Y)$. In short, if the offset for an output buffer Y is denoted by offset(Y), the contents of Y can be described as consisting of data elements in positions jw(Y)+offset(Y), for j=0, 1, . . . k−1.

It is easy to see that multiple copies of data elements need not actually be materialized. The outputs to be stored in Y can be identified as follows: First sort the input buffers individually and then start merging them. While merging, if the data element just selected originates from buffer $Xi$, a counter (initialized to zero) gets incremented $w(X_i)$ times. If, while being incremented, the counter hits a value that corresponds to a position for which Y should be populated, the selected element is marked; otherwise it is left unmarked. In the end, all marked elements are collected together into one of the input buffers, which is labeled full; the remaining input buffers are labeled empty.

Figure 4:
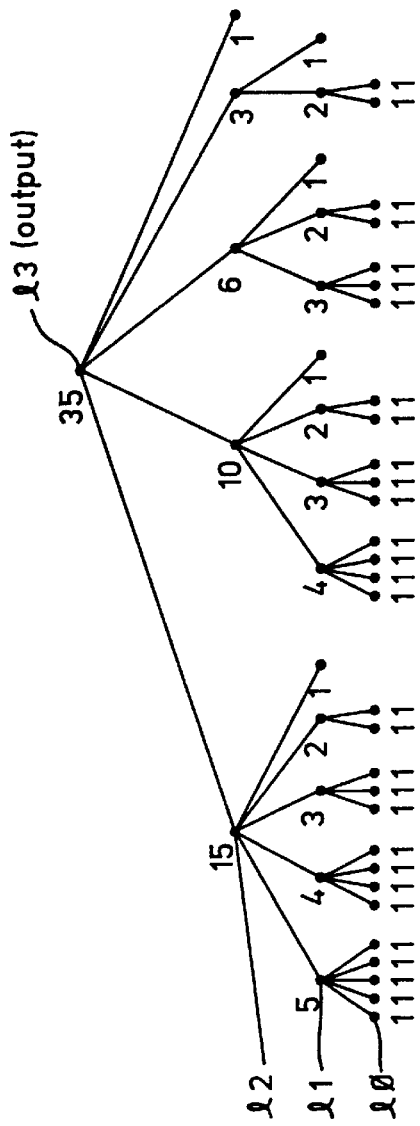
FIG. 4 is a schematic representation of a data tree illustrating logical buffers of this invention.
Figure 5A:
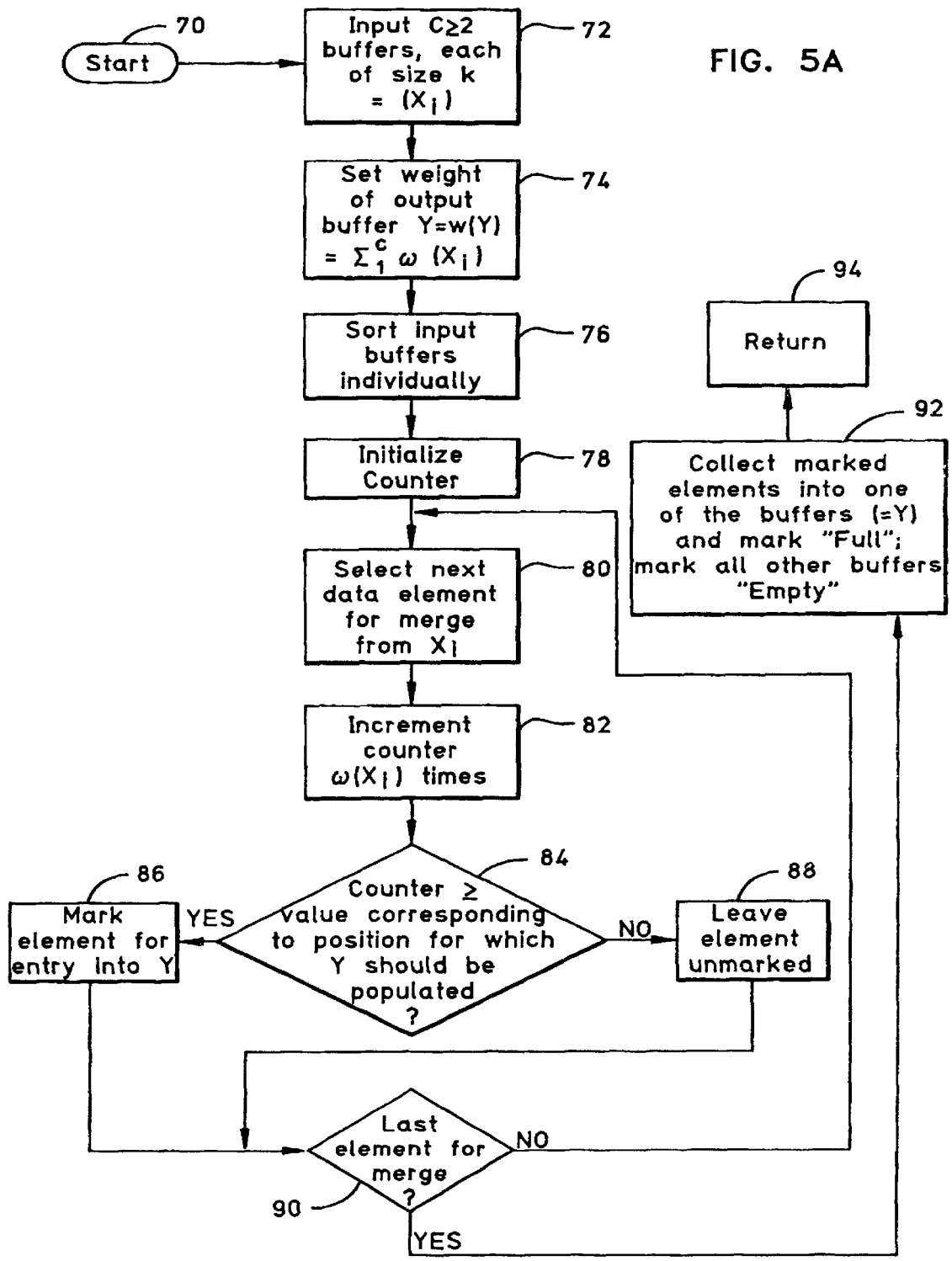
FIG. 5A is a flow chart showing a COLLAPSE operation for collapsing full buffers.

FIGS. 4, 5A and 5B illustrate the COLLAPSE operation, it being understood that FIG. 4 represents a data tree for a particularly preferred COLLAPSE operation, FIG. 5A represents the logic of a more generalized COLLAPSE operation and FIG. 5B represents a numerical example of a COLLAPSE operation. As shown in FIG. 4, the sequence of operations set forth below can be represented by the data tree shown, with the vertex set of the tree (except the root) being the set of all logical buffers produced during the computation. It is to be understood that the data tree shown in FIG. 4 represents logical buffers, and not physical buffers, as will become clearer after subsequent disclosure.

The data tree includes a plurality of levels. A level is denoted by l. The value of l ascends as an integer from 0, with 0 denoting the lowest level of the data tree, and with level l being lower than level l+1.

In FIG. 4 each buffer is labelled with its weight. The leaves of the data tree, denoted as having weights of 1, correspond to the initial buffers that are populated from the data set with the NEW operation. An edge is drawn as shown from each input buffer to the output buffer of a COLLAPSE operation.

Starting in the lower left corner in the example shown, for b=5, input buffers for a first COLLAPSE are all weight "1" buffers at level 0. The five input buffers are each filled with k sorted data elements and collapsed to an output buffer with a weight of 5, at level 1. Next, the remaining four input buffers at level 0 are again populated with k sorted data elements, collapsed to a level 1 output buffer with a weight of 4, and so on. When four output buffers with weights of 5, 4, 3, and 2 have been created at level 1, the remaining input buffer is filled with k sorted data elements, promoted to level 1, and collapsed with the four output buffers to a single output buffer at level 2, with a weight of 15. Now, the four available buffers are demoted to level zero, and so on, until four output buffers with weights 15, 10, 6, and 3 have been created at level 2. Now, the remaining input buffer is filled with k sorted data elements (with augmentation, if necessary), promoted to level 2 and collapsed in an OUTPUT operation to a buffer of weight 35 at level 3. For reference, the data tree shown in FIG. 4 represents fourteen collapse operations, using five buffers, and thus has a height "h" of three.

With the above data tree in mind, reference is now made to FIG. 5A in understanding the COLLAPSE operation. In the preferred embodiment, the COLLAPSE operation receives $c \geq 2$ input buffers $X_1, X_2, \ldots, X_c$ and outputs a buffer, Y, all of size k. At the end of a COLLAPSE operation, all but one input buffer is marked empty, with the output buffer Y being the buffer that is marked full. Thus, Y is logically different than $X_1, X_2, \ldots, X_c$ and the output buffer produced at level 3 but physically occupies space corresponding to one of them.

Commencing at start state 70, the logic moves to block 72, wherein an integer number c of input buffers $X_i$, each of size k elements, is input, wherein $c \geq 2$. Then, moving to block 74 the weight $w(Y)$ of a logical output buffer Y is established to be the sum of the weights $w(X_i)$ of the input buffers $X_1$, $X_2, \ldots, X_c$.

Proceeding to block 76, the data elements in each input buffer $X_i$ are sorted, that is, the input buffers $X_1, X_2, \ldots$, $X_c$ are sorted individually, unless the buffer has been created by a previous collapse operation in which case the elements will have been received into the buffer in sorted order. Then, at block 78 the logic begins to merge the input buffers. To conserve space such that fewer physical buffers need actually be provided than there are logical buffers, the collapsing of input buffers into an output buffer commences as soon as the merging step at block 78 commences.

This is illustrated at block 80, which is the beginning step of a logical loop that is serially undertaken to merge the sorted data elements from input buffers $X_1, X_2, \ldots X_c$. Block 80 selects the next data element in sorted sequence from some one of the input buffers. Moving to block 82, a counter, initialized to zero in step 78, is incremented $w(X_i)$ times. At decision diamond 82 it is determined whether the value of the counter is at least equal to a value corresponding to a position for which the output buffer Y should be populated.

The values corresponding to positions for which the output buffer Y should be populated are determined as follows. In accordance with the present invention, the data elements in the output buffer Y are k equally spaced data elements in a sorted sequence of data elements from the input buffers $X_1, X_2, \ldots, X_c$, with each data element from input buffer $X_i$ replicated $w(X_i)$ times. When the weight $w(Y)$ of the output buffer Y is odd, these k data elements (i.e., the positions for which Y should be populated) are in positions $jw(Y)+\{w(Y)+1\}/2$ for $j=0,1, \ldots, k-1$. On the other hand, when the weight $w(Y)$ of the output buffer Y is even, these k data elements can be in positions $jw(Y)+w(Y)/2$ or in $jw(Y)+\{w(Y)+2\}/2$ for $j=0,1, \ldots, k-1$. In the present invention, the COLLAPSE operation alternates between these two choices on successive invocations with even output buffer weight $w(Y)$.

When the test at decision diamond 82 is positive, the data element is marked for entry into the output buffer Y at block 86. Otherwise, the data element is left unmarked at block 88.

From block 86 or 88 the logic moves to decision diamond 90 to determine whether the last data element in the input buffers $X_1, X_2, \ldots, X_c$ has been merged. If not, the logic loops back to block 80 for the next data element. On the other hand, when all input data elements have been merged, the logic moves to block 92 to collect all marked data elements into one of the buffers, which is designated to be the output buffer Y, and this buffer is marked "full". All other buffers involved in the COLLAPSE operation just described are marked empty, and are then available, at block 42 of FIG. 2. As can be appreciated in reference to the above discussion and FIG. 4, the output buffer Y can be used as a full input buffer COLLAPSE operation.

FIG. 5B illustrates a numerical example of the COLLAPSE operation in the case where b=3 and k=5. Assume that three buffers at some level have been filled with sorted data elements and that the weights of these buffers are 2, 3, and 4. To COLLAPSE these buffers into a single output buffer, the elements to the input buffers are taken, in sequence, to produce a sorted sequence in which each data element is replicated at its sequence position a number of times equal to the weight of the buffer from which it is obtained. Thus, the data element 12 is obtained from an input buffer having a weight of 2. Assuming sorting according to numerical magnitude, the data element 12 is the first in the sorted sequence, and is replicated twice in that sequence. Next chosen is 23, which is replicated three times, and so on. Observe that the sorted sequence is in the form of a 2-dimensional array in which the number of horizontal positions is equal to the sum of the weights of the input buffer (which is also the weight of the output buffer) and a vertical dimension is equal to k. In this COLLAPSE operation, the offset is 5 since $w(Y)$ is odd. This means that the column of data elements five positions to the right of the column containing the first data element in the sorted sequence is entered into the output buffer.

The OUTPUT Operation

This operation is performed exactly once, just before termination. It takes $c \geq 2$ full input buffers, $X_1, X_2, \ldots, X_c$, of size k. It outputs a single data element, corresponding to the approximate $\phi'$-quantile of the augmented data set. Recall that the $\phi'$-quantile of the original data set corresponds to the $\phi'$-quantile of the augmented data set, consisting of the original data set plus $-\infty$ and $+\infty$ data elements added to the last buffer.

Similar to COLLAPSE, this operation logically makes $w(X_i)$ copies of each data element in $X_i$ and sorts all the input buffers together, taking the multiple copies of each data element into account. The output is the element in position $\lceil \phi'kw \rceil$, where $W=w(X_1)+w(X_2)+ \ldots +w(X_c)$.

FIG. 6 shows the OUTPUT operation. At block 96, an integer number $c \geq 2$ full input buffers is input, and then at block 98 the input buffets are collapsed into a single output sequence of data elements using the COLLAPSE operation described above. The output sequence need not itself be a buffer. Then, at block 100 the data element in position $\phi kW$ in the output sequence is returned as the approximate quantile being sought, wherein W is the sum of the weights $w(X_1)+w(X_2)+ \ldots +w(X_c)$ of the buffers that were input to the OUTPUT operation. Manifestly, for more than one user-designated value of $\phi$, more than one quantile may be represented, each by a respective data element.

Recalling the data tree shown in FIG. 4 and now referring to FIG. 7, a particularly preferred policy for invoking COLLAPSE is shown. An integer $L(X)$ is associated with each buffer X at level l, with 0 denoting the lowest level. Then at start state 102, the logic moves to block 104 to set a variable l equal to the lowest level of currently full buffers.

Moving to decision diamond 106, the logic determines whether exactly one empty buffer exists. If so, the logic proceeds to block 108 to invoke the NEW operation discussed above, assigning the empty buffer to a level equal to l. Next, the logic moves to decision diamond 110 to determine whether the above-disclosed conditions for invoking the OUTPUT operation have been met. If they have, the logic moves to block 112 to invoke the OUTPUT operation; otherwise, the logic loops back to block 104.

If, on the other hand, it is determined at decision diamond 106 that one and only one empty buffer does not exist, the logic moves to decision diamond 114 to determine whether two or more empty buffers exist. If two or more empty buffers exist, the logic proceeds to block 116 to invoke the NEW operation, assigning to each empty buffer a level equal to 0. The logic then proceeds to decision diamond 110 to undertake the above-disclosed steps.

In contrast, if no empty buffers exist, the logic moves from decision diamond 114 to block 118. At block 118, the present invention invokes the COLLAPSE operation on all buffers at the $l^{th}$ level of the logical data tree exemplified in FIG. 4. The resulting output buffer is assigned level l+1. The logic then loops back to block 104.

Figure 8:
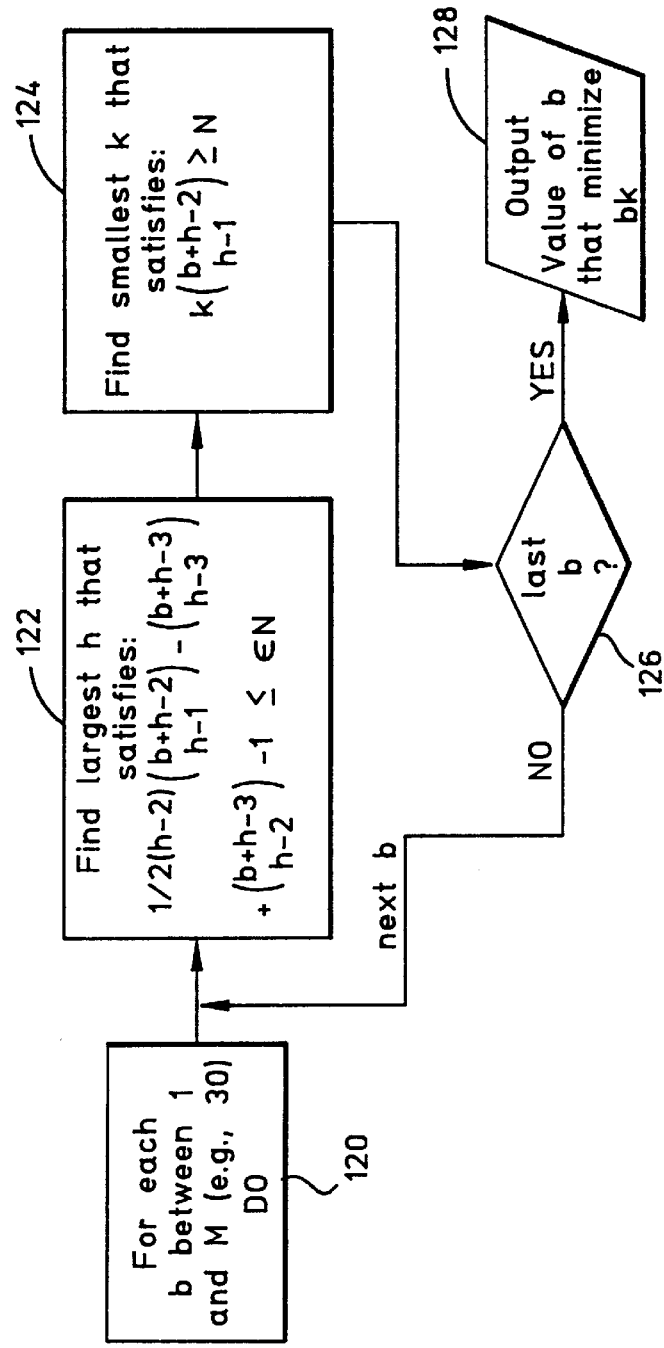
FIG. 8 is a flow chart showing the steps for determining a number b and a size k of buffers, based on a user-defined $\epsilon$ and N.

FIG. 8 shows the method for determining the number b of buffers and size k of each buffer for the policy shown in FIG. 7, based on the user-defined approximation error $\epsilon$. A "DO" loop is entered at block 120 for each candidate integer b between 1 and m, wherein m can be, e.g., 30. Moving to block 122, a first constraint is tested for. In accordance with the present invention, the first constraint is to find the largest data tree height h that satisfies the following inequality:

[0.5(h−2)*A]−B+C−1$\leq \epsilon$N, wherein N=number of elements in the data stream, and A, B, and C are combinatorial values, namely, A=number of ways to obtain h−1 elements from a set of size of b+h−2, B=number of ways to obtain h−3 elements from a set of size of b+h−3, and C=number of ways to obtain h−2 elements from a set of size of b+h−3.

After having determined the largest height h satisfying the first constraint for the integer b under test, the logic moves to block 124 to find the smallest integer k which satisfies a second constraint, namely, the inequality $kA \geq N$. The logic then moves to decision diamond 126 to determine whether the last value for b has been tested, and if not, the logic selects the next b and loops back to block 122. Otherwise, the logic moves to output step 128 to output the value of b that minimizes the product b*k.

The above-described COLLAPSE policy is a preferred policy, but it is to be understood that other collapse policies, although less preferred because they require more memory space than the policy shown in FIGS. 7 and 8 and represented by the data tree shown in FIG. 4, can be incorporated in the practice of the present invention. See for example, the quantile determination algorithms of Munro et al., cited earlier, and K. Alsabati et al. in "A One Pass Algorithm for Accurately Estimating Quantiles for Disk-Resident Date", in Proc. 23rd VLDB Conference, Athens, Greece, 1997.

If desired, randomly sampling "s" data elements of a larger data set having N elements, where N>s, and then applying the above-disclosed invention to the "s" data elements to output an approximate quantile for the N data elements in the larger data set can be used to further reduce the memory requirements of the present invention. The number "s" of samples is sufficiently large such that the $\epsilon/2$-approximate $\phi$ quantile data element is guaranteed to represent an $\epsilon$-approximate $\phi$-quantile data element of the larger data set, with a probability of $1-\delta$. As intended by the present invention, $\delta$ is a user-specified value between zero and one. In one preferred embodiment, let $\epsilon = \epsilon_1 + \epsilon_2$, and let the number s of data elements satisfy the following inequality:

$$s \geq \{\log(2\delta^{-1})\}/2\epsilon_2^2, \text{ wherein } \epsilon_1 = \alpha\epsilon, \epsilon_2 = (1-\alpha)\epsilon, \text{ and } \alpha \in [0.2, 0.8].$$

As $\alpha$ approaches one, the number of samples increases. As $\alpha$ approaches zero, the approximation guarantee required of the deterministic algorithm increases. In either case, the memory requirements blow up. Therefore, there is an optimal value of $\alpha$ that minimizes memory. For practical values of $\epsilon$ and $\delta$, the overall memory requirements for different values of $\alpha$ in 0.001 increments is computed, with the value for $\alpha$ being selected that minimizes the memory requirements. It will be appreciated that the value selected for "s" is chosen to apportion the approximation error $\epsilon$ between the error induced by sampling and the approximation error for the larger data set with N data elements so as to minimize the product b*k.

While the particular SINGLE PASS SPACE EFFICIENT SYSTEM AND METHOD FOR GENERATING APPROXIMATE QUANTILES SATISFYING AN APRIORI USER-DEFINED APPROXIMATION ERROR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

We claim:

1. A computer system, comprising:

a computer;

one or more input devices associated with the computer for providing a user specification, the user specification establishing at least one approximate $\phi$-quantile and a quantile approximation error $\epsilon$;

a data set of N data elements accessible by the computer;

computer usable code means executable by the computer for determining a $\phi$-quantile data element in the data set, the computer usable code means having:

means for determining a number b of buffers and a size k of each buffer, based at least in part on the permissible approximation error $\epsilon$ and N;

means for filling empty buffers with data elements from the data set to establish a plurality of input buffers;

means for collapsing data elements from input buffers of the plurality of input buffers into at least one output buffer; and means for outputting from an output buffer a $\phi$-quantile data element.

2. The system of claim 1, wherein the $\phi$-quantile data element is an approximate $\phi$-quantile data element within $\epsilon$ N data element positions of the true $\phi$-quantile of the data set.

3. The system of claim 1, wherein an output buffer is used as an input buffer for a collapsing operation, and wherein the means for collapsing is invoked when all input buffers contain k data elements.

4. The system of claim 1, wherein each input buffer $X_i$ has a respective weight $w(X_i)$ and the means for collapsing includes:

means for sorting data elements of at least some input buffers, each input buffer having a respective weight $w_i$ representative of a number of data elements represented by each data element in the input buffer;

means for selecting a next sorted data element from an input buffer $X_i$ for merging;

means for periodically incrementing a counter $w(X_i)$ times in response to the means for selecting; and means for designating a data element from the input buffer $X_i$ as an output buffer data element when the counter counts to a predetermined value.

5. The system of claim 4, wherein the means for collapsing further includes:

means for collecting data elements designated as output buffer data elements into an output buffer;

means for designating input buffers as empty;

means for designating the output buffer as a full input buffer; and means for then reinvoking the means for filling to fill with data elements input buffers designated as empty, the full input buffer being usable as an input buffer by the means for collapsing.

6. The system of claim 1, wherein the means for filling is further for filling a buffer with $-\infty$ and $+\infty$ data elements when fewer than k data elements remain to be processed in the data set and the means for outputting is further for outputting a biased quantile data element when a buffer has been filled with $-\infty$ and $+\infty$ data elements.

7. The system of claim 1, wherein the means for collapsing being represented by a multi-level data tree.

8. The system of claim 7, further comprising:

means for establishing an integer l as a lowest level of full buffers in the data tree;

means for invoking the means for filling when one or more empty buffers exist, the means for invoking assigning the empty buffer to the, level l when exactly one empty buffer exists, and otherwise assigning each empty buffer to a lowest level of the data tree when more than one empty buffer exists; and means for invoking the means for collapsing to collapse buffers at level l when no empty buffers exist, the output buffer being assigned to the level l+1.

9. The system of claim 1, wherein the means for determining minimizes the product b*k subject to at least one constraint, the constraint being a function of the permissible approximation error $\epsilon$ and N.

10. The system of claim 1, wherein the data set is a sampled data stream containing s data elements of the data set, wherein s is sufficiently large such that the approximate φ-quantile data element of the sampled data set is guaranteed to represent a true quantile of the data set and to lie within the quantile approximation error ε with a probability of 1−δ, wherein δ is a user-defined number between zero and one.

11. The system of claim 10, wherein s has a value that apportions ε between a sampling induced error (1−∞) ε and an approximation error α ε, where α [0.2, 0.8].

12. The system of claim 1, wherein the computer usable code means includes a database management system.

13. For a data set, a computer-implemented method for generating, in a single pass over the data set, one or more approximate quantiles respectively representative of true quantiles of the data set while minimizing computer memory requirements, the approximate quantiles differing from the respective true quantiles by no more than a user-defined approximation error ε, the method comprising:
 establishing b buffers, each having the capacity to store k data elements, b and k being integers related to ε; and
 alternately filling all empty buffers with data elements from the data set to establish input buffers and then storing only a subset of the data elements from the input buffers into one or more output buffers until the entire data set is processed, one of the data elements being an approximate quantile.

14. The method of claim 13, wherein the storing is accomplished by collapsing input buffers into at least one output buffer, the method further including outputting an approximate φ-quantile data element from an output buffer.

15. The method of claim 14, wherein the at least one output buffer is used as an input buffer during collapsing, and wherein input buffers are collapsed when all input buffers contain k data elements.

16. Tne method of claim 14, wherein collapsing includes:
 sorting data elements of at least some input buffers $X_1$, $X_2$, ..., $X_c$, each input buffer having a respective weight $w(X_i)$ representative of the number of data elements represented by a data element in input buffer $X_i$;
 repeatedly selecting a next sorted data element from one of the input buffers for merging;
 incrementing a counter $w(X_i)$ times in response to each repetition of selecting; and
 designating a data element from an $i^{th}$ input buffer as an output buffer data element when the counter is incremented to a predetermined value.

17. The method of claim 16, wherein collapsing further includes:
 collecting data elements designated as output buffer data elements into an output buffer;
 designating input buffers as empty;
 designating the output buffer as a full input buffer; and
 repeating filling to fill input buffers designated as empty with data elements, the full input buffer being usable as an input buffer for collapsing.

18. The method of claim 14, wherein filling includes filling a buffer to its full capacity of k data elements with −∞ and +∞ data elements when fewer than k data elements remain in the data set and at least one buffer is empty, and wherein outputting selects a biased φ-quantile data element in respect to number of −∞ and +∞ data elements filled.

19. The method of claim 14, wherein collapsing is represented by a data tree with an integer number of levels.

20. The method of claim 14, wherein establishing minimizes the product b*k subject to at least one constraint, the constraint being a function of ε and the number of data elements in the data set.

21. The method of claim 14, wherein the data set is a sampled data set containing s data elements of a larger data set containing N data elements, where N>s and s is sufficiently large such that the approximate φ-quantile data element is guaranteed to represent a true φ-quantile data element of the larger data set and to lie within the quantile approximation error ε with a probability of 1−δ, wherein δ is a user-defined number between zero and one.

22. The method of claim 14, wherein the method is implemented in a database management system.

23. A computer program device comprising:
 a computer program storage device readable by a digital processing apparatus; and
 a program means on the program storage device and including instructions executable by the digital processing apparatus for performing method steps for determining at least one desired approximate φ-quantile data element in a data set within at least one user-defined approximation error ε, the method steps comprising:
  filling at most b empty buffers with at most k data elements of the data set to establish one or more input buffers, b and k being related to the approximation error ε;
  storing a subset of data elements from the one or more input buffers in at least one output buffer; and
  identifying a data element in an output buffer as representing the desired approximate φ quantile.

24. The computer program device of claim 23, wherein the storing step is undertaken by a step of collapsing input buffers into at least one output buffer, and wherein the filling and collapsing steps are alternatingly undertaken by the program means.

25. The computer program device of claim 24, wherein the at least one output buffer is used as an input buffer for a collapsing step, and wherein the collapsing step is invoked by the program means when all input buffers contain k data elements.

26. The computer program device of claim 24, wherein the collapsing step includes:
 sorting data elements of input buffers $X_1$, $X_2$, ..., $X_c$, each input buffer having a respective weight $w(X_i)$ representative of the number of data elements represented by a data element in input buffer $X_i$;
 repeatedly selecting a next sorted data element from one of the input buffers for merging;
 incrementing a counter $w(X_i)$ times in response to each repetition of the selecting step; and
 designating a data element from an $i^{th}$ input buffer as an output buffer data element when the counter is incremented to a predetermined value.

27. The computer program device of claim 26, wherein the collapsing step includes:
 collecting data elements designated as output buffer data elements into an output buffer;
 designating the input buffers as empty;
 designating the output buffer as a full input buffer; then
 repeating the filling step to fill input buffers designated as empty with data elements, the full input buffer being usable as an input buffer by the collapsing step.

28. The computer program device of claim 24, wherein the filling step includes:
 filling a buffer to its full capacity of k data elements with −∞ and +∞ data elements when fewer than k data elements remain in the data set and at least one buffer is empty;

outputting a biased φ-quantile data element respecting the addition of −∞ and +∞ data elements when fewer than k data elements remain in the data set and at least one buffer is empty.

29. The computer program device of claim 24, wherein the collapsing step is represented by a multi-level data tree.

30. The computer program device of claim 29, wherein the method steps undertaken by the program means further comprise:

establishing a lowest level l of full buffers in the data tree;

filling empty buffers when one or more empty buffers exist and assigning an empty buffer to the level l when exactly one empty buffer exists, otherwise assigning each empty buffer to a level of the data tree lower than l when more than one empty buffer exists; and when no empty buffers exist, collapsing buffers at the level l to render an output buffer, the output buffer being associated with a next level l+1 of the data tree.

31. The computer program device of claim 23, wherein the program means further undertakes the step of minimizing the product b*k subject to at least one constraint, the constraint being a function of the permissible approximation error $\epsilon$ and the number N of data elements in the data set.

32. The computer program device of claim 23, wherein the data set is a sampled data set containing s elements of a larger data set containing N elements, where N>s, and s is sufficiently large such that the approximate φ quantile data element is guaranteed to represent a true φ-quantile data element of the larger data set and to lie within the quantile approximation error $\epsilon$ with a probability of 1−δ, wherein δ is a user-defined number between zero and one.

33. The computer program device of claim 23, wherein the instructions are implemented in a database management system.

34. A method for determining an approximate φ-quantile of a set of N data elements in a single pass over the set while minimizing memory usage and meeting an approximation error guarantee, comprising:

receiving at least one desired φ-quantile;

receiving the approximation error guarantee;

determining a number of buffers;

determining a size of each buffer, the determining steps being based at least in part on the approximation error guarantee and N;

loading data elements from the data set into the buffers;

sorting the data elements in the buffers;

collapsing the buffers when all buffers are in a full state;

repeating the loading, sorting, and collapsing steps until all data elements of the data set have been processed; and outputting at least one approximate φ-quantile data element, based on a collapsing step.

35. A method for determining an approximate φ-quantile of a set of N data elements in a single pass over the set while minimizing memory usage and meeting an approximation error guarantee, comprising:

receiving at least one desired φ-quantile;

receiving the approximation error guarantee;

determining a number of buffers;

determining a size of each buffer, the determining steps being based at least in part on the approximation error guarantee and N;

sorting data elements from the data set;

loading the data elements in the buffers;

collapsing the buffers when all buffers are in a full state;

repeating the loading, sorting, and collapsing steps until all data elements of the data set have been processed; and outputting at least one approximate φ-quantile data element, based on a collapsing step.

* * * * *